(12) United States Patent
Peng et al.

(10) Patent No.: US 11,631,154 B2
(45) Date of Patent: Apr. 18, 2023

(54) METHOD, APPARATUS, DEVICE AND STORAGE MEDIUM FOR TRANSFORMING HAIRSTYLE

(71) Applicant: Beijing Baidu Netcom Science and Technology Co., Ltd., Beijing (CN)

(72) Inventors: Haotian Peng, Beijing (CN); Chen Zhao, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 85 days.

(21) Appl. No.: 17/202,893

(22) Filed: Mar. 16, 2021

(65) Prior Publication Data
US 2021/0201441 A1   Jul. 1, 2021

(30) Foreign Application Priority Data
Jul. 31, 2020   (CN) .................... 2020107585983.6

(51) Int. Cl.
*G06T 3/00*       (2006.01)
*G06K 9/62*       (2022.01)
(Continued)

(52) U.S. Cl.
CPC .......... *G06T 3/0006* (2013.01); *G06K 9/6215* (2013.01); *G06K 9/6218* (2013.01);
(Continued)

(58) Field of Classification Search
CPC . G06T 3/0006; G06T 3/0093; G06T 2210/12; G06T 2210/10004; G06T 2210/20096; G06T 2210/20121; G06T 2210/20124; G06T 2210/30201; G06T 7/149; G06T 7/136; G06T 11/60; G06K 9/6215; G06K 9/6218; G06K 9/6256;
(Continued)

(56) References Cited

U.S. PATENT DOCUMENTS 5,060,171 A * 10/1991 Steir .................... G06T 19/006
                                                        345/630
2018/0260843 A1*  9/2018 Hiranandani .......... G06V 10/82
2019/0035149 A1*  1/2019 Chen ...................... G06T 17/20

FOREIGN PATENT DOCUMENTS

JP       2002-083318 A       3/2002
JP       2012-128597 A       7/2012
(Continued)

OTHER PUBLICATIONS

European Patent Office; Extended European Search Report for Application No. 21163243.5, dated Aug. 6, 2021 (8 pages).
(Continued)

*Primary Examiner* — Edward F Urban
*Assistant Examiner* — Wassim Mahrouka
(74) *Attorney, Agent, or Firm* — Nixon Peabody LLP

(57) ABSTRACT

A method, apparatus, device, and storage medium for transforming a hairstyle are provided. The method may include: determining a face bounding box according to information on face key points of acquired face image; constructing grids according to the face bounding box; deforming, by using an acquired target hairstyle function, edge lines of at least a part of the constructed grids, which comprises the hairstyle, to obtain a deformed grid curve; determining a deformed hairstyle in the face image according to the deformed grid curve.

9 Claims, 10 Drawing Sheets

(51) Int. Cl.
   *G06V 10/44* (2022.01)
   *G06V 40/16* (2022.01)
(52) U.S. Cl.
   CPC ............ *G06V 10/44* (2022.01); *G06V 40/165* (2022.01); *G06V 40/171* (2022.01); *G06T 2210/12* (2013.01)
(58) Field of Classification Search
   CPC ........ G06K 9/62; G06V 10/44; G06V 40/165; G06V 40/171; G06V 10/449; G06V 10/82; G06N 3/0454; G06N 3/04; G06N 3/0075
   See application file for complete search history.

(56) References Cited

FOREIGN PATENT DOCUMENTS

| JP | 2014090885 A | 5/2014 |
|---|---|---|
| WO | WO 2018/084241 A1 | 5/2018 |
| WO | WO 2019/216879 A1 | 11/2019 |

OTHER PUBLICATIONS

Anonymous; "B-spline—Wikipedia"; retrieved from https://en.wikipedia.org/w/index.php?title=B-spline&oldid=967159979; retrieved on May 5, 2021; XP055801535 (12 pages).

* cited by examiner

METHOD, APPARATUS, DEVICE AND STORAGE MEDIUM FOR TRANSFORMING HAIRSTYLE

CROSS-REFERENCE TO RELATED APPLICATIONS

This application claims priority to Chinese Application No. 202010758598.6, filed on Jul. 31, 2020 and entitled "Method, Apparatus, Device and Storage Medium for Transforming Hairstyle," the content of which is hereby incorporated by reference in its entirety.

TECHNICAL FIELD

The present disclosure relates to a field of computer technologies, in particular, to a field of image processing technologies, augmented reality technologies, and deep learning technologies, and more particularly, to a method, apparatus, device, and storage medium for transforming a hairstyle.

BACKGROUND

A hairstyle may express a user's personality, self-confidence and attitude. Thus, the hairstyle is an important aspect of an individual's appearance.

Currently, the user may change the hairstyle by (1) deforming the hairstyle through affine-transformation to obtain a deformed hairstyle; or (2) modifying a large amount of training data set of the CycleGAN, for example, the training data set of the CycleGAN is modified in a large amount to manually obtain a modified training data set of the CycleGAN, and then using the modified training data set to train the CycleGAN for obtaining a deformed hairstyle.

SUMMARY

The present disclosure provides a method, apparatus, device, and storage medium for transforming a hairstyle.

According to one aspect of the present disclosure, there is provided a method for transforming a hairstyle, comprising: determining a face bounding box according to acquired information on face key points of a face image; constructing grids according to the determined face bounding box; deforming, by using an acquired target hairstyle function, edge lines of at least a part of the constructed grids to obtain a deformed grid curve, the edge lines comprising the hairstyle; determining a deformed hairstyle in the face image according to the deformed grid curve.

According to another aspect of the present disclosure, there is provided an apparatus for transforming a hairstyle, comprising: a first determining module configured to determine a face bounding box according to acquired information on face key points of a face image; a grid building module configured to construct grids according to the determined face bounding box; a grid deformation module configured to deform, by using an acquired target hairstyle function, edge lines of at least a part of the constructed grids, the edge lines comprising the hairstyle, to obtain a deformed grid curve; a second determining module configured to determine a deformed hairstyle in the face image based on the deformed grid curve.

According to a third aspect of the present disclosure, there is provided an electronic device comprising at least one processor; and a memory connected to the at least one processor. The memory stores instructions executable by the at least one processor to enable the at least one processor to perform the method of the first aspect.

According to a fourth aspect of the present disclosure, there is provided a non-transitory computer readable storage medium for storing computer instructions, and the computer instructions are used for causing a computer to perform the method of the first aspect.

It shall be understood that the description in this section does not intend to identify key or critical features of the embodiments of the disclosure, nor does it intend to limit the scope of the disclosure. Other features of the present disclosure will become readily apparent from the following description.

BRIEF DESCRIPTION OF THE DRAWINGS

The drawings intend to provide a better understanding of the present disclosure and are not construed as limiting the application. Wherein.

DETAILED DESCRIPTION

Example embodiments of the present disclosure are described below in connection with the accompanying drawings, in which various details of the embodiments of the present disclosure are included to facilitate understanding, and are to be considered as example only. Accordingly, the ordinary skilled in the art shall recognize that various changes and modifications may be made to the embodiments described herein without departing from the scope and spirit of the present disclosure. Also, for clarity and conciseness, descriptions of well-known functions and structures are omitted from the following description.

According to the method and apparatus for transforming a hairstyle of the above-described embodiment of the present disclosure, a face bounding box is determined according to information on face key points of acquired face image. Thereafter, grids are constructed according to the face bounding box. Finally, it deforms, by using an acquired target hairstyle function, edge lines of at least a part of the constructed grids, which comprises the hairstyle, to obtain a deformed grid curve. In this process, the acquired target hairstyle function is used to deform the edge lines of the part (which comprises the hairstyle) of the constructed grids, and thus the proposed method may only deform the edge lines of said part including the hairstyle. Accordingly, it does not need to transform the whole face image while the output of the deforming is accurate. Therefore, the deformed hairstyle in the face image is not distorted, which otherwise will be distorted according to the conventional method of performing affine transformation on the hairstyle, or the method of manually performing mass modification on the training data set of the CycleGAN.

Figure 1:
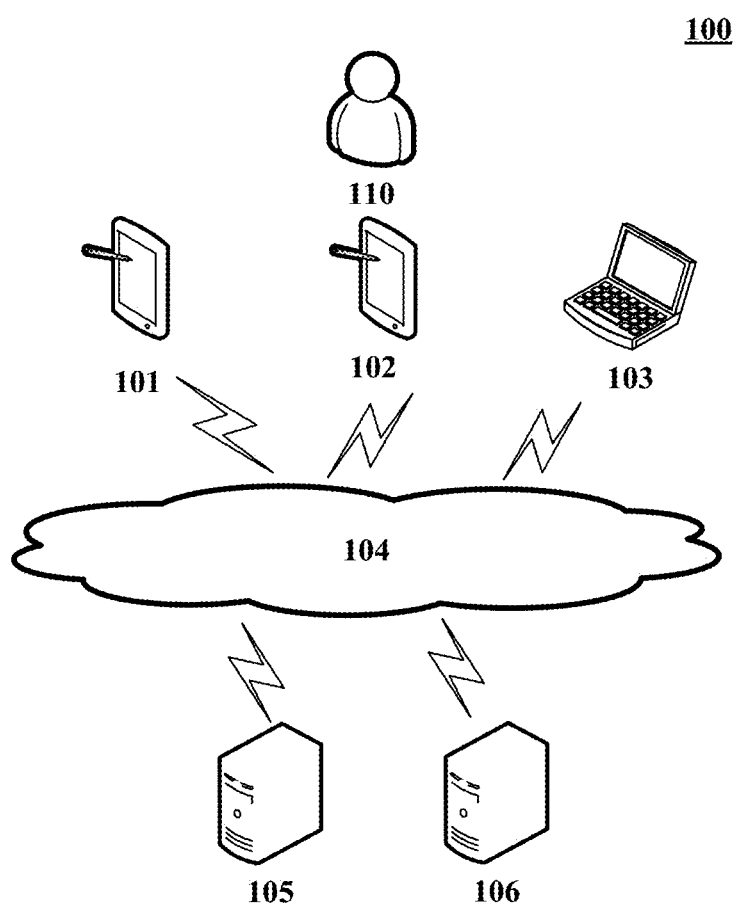
FIG. 1 is an example system architecture in which the present disclosure may be applied.

FIG. 1 illustrates an example system architecture 100 in which embodiments of a method for transforming a hairstyle or an apparatus for transforming a hairstyle of the present disclosure may be applied.

As illustrated in FIG. 1, the system architecture 100 may comprise terminal devices 101, 102, 103, a network 104, and a server 105. The network 104 serves as a medium for providing a communication link among the terminal devices 101, 102, 103 and the server 105. The network 104 may comprise various types of connections, such as wired, wireless communication links, or fiber optic cables, or the like.

A user may interact with the server 105 through the network 104 by using the terminal devices 101, 102, 103 to receive or send messages, etc. Various applications may be installed on the terminal devices 101, 102, 103, such as an image acquisition application, a hairstyle conversion application, a multi-party interactive application, an artificial intelligence application, and so on.

The terminal devices 101, 102, 103 may be hardware or software. Where the terminal devices 101, 102, 103 are hardware, they may be various electronic devices which support a document processing application, including but not limited to an intelligent terminal, a tablet computer, a laptop computer, a desktop computer, and the like. Where the terminal devices 101, 102, and 103 are software, they may be installed in the electronic devices listed above. It may be implemented, for example, as a plurality of software or software modules for providing distributed services, or as a single software or software module. It is not specifically limited herein.

The server 105 may be a server providing various services, such as a background server providing a support to the terminal devices 101, 102, 103. The background server may perform, for example, analyzing received data such as request, and feeding the analyzed result back to the terminal device.

It should be noted that the server may be hardware or software. Where the server is hardware, a distributed server cluster composed of multiple servers may be implemented, or a single server may be implemented. Where the server is software, it may be implemented, for example, as a plurality of software or software modules for providing distributed services, or it may be implemented as a single software or software module. It is not specifically limited herein.

In practice, the method for transforming the hairstyle provided in the embodiments of the present disclosure may be performed by the terminal devices 101, 102, 103 or the server 105, and the apparatus for transforming the hairstyle may also be implemented in the terminal devices 101, 102, 103 or the server 105.

It shall be understood that the terminal devices, networks and the number of servers in FIG. 1 are merely illustrative. There may be any number of terminal devices, networks, and servers as desired for implementation.

In the prior art, for a technical solution of generating a smooth hairstyle, affine transformation is performed on the hairstyle to be deformed; alternatively, the training data set for the generative CycleGAN is needed to be modified in large quantities, for example manually. Wherein, the affine transformation may be performed on the entire image in which the hairstyle is located. At same time, the affine transformation is also performed on an area other than the hairstyle in the image (for example, the facial features), and finally, the transformed image is distorted, resulting the purpose of transforming the hairstyle fails. Moreover, the large-scale modification of the training data set of the CycleGAN will undoubtedly increase the calculation amount, the calculation consumes time as well as memory space. In particular, the more complex the hairstyle is, the corresponding training data set will be correspondingly complex, and thus the training becomes more difficult. In particular, when the training data set of the CycleGAN is modified in a large quantity in a manual manner, on the one hand, the labor cost is high and the efficiency is low; on the other hand, the finally generated training data collection is caused by human factors, resulting in unstable hairstyles and distorted hairstyles, which may in turn causes trouble to the subsequent training of the CycleGAN. In summary, both of the above methods distort the deformed hairstyle.

Figure 2:
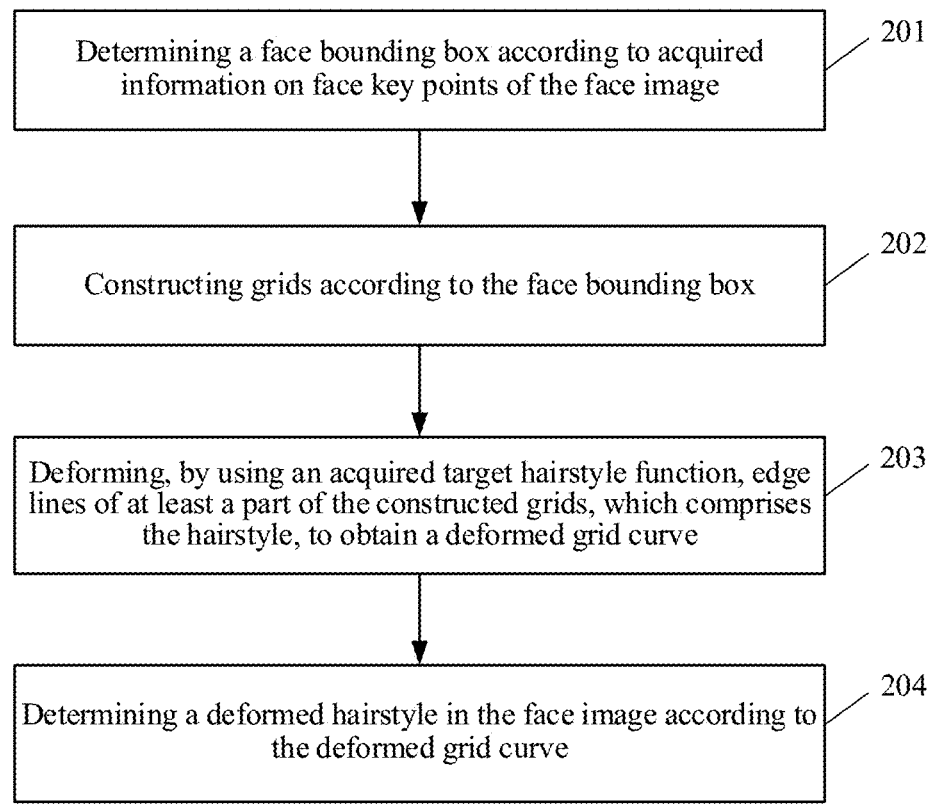
FIG. 2 is a flow chart of a method for transforming a hairstyle according to embodiments of the present disclosure.

Referring to FIG. 2, there is illustrated a flow 200 of a method for transforming a hairstyle in accordance with embodiments of the present disclosure. The method for transforming the hairstyle comprises the following steps.

Step 201: determining a face bounding box according to acquired information on face key points of the face image.

In the present embodiment, an execution entity of a method for transforming a hairstyle (for example, a terminal device or a server illustrated in FIG. 1) may determine a face bounding box according to acquired information on face key points of the face image.

Determining the face bounding box according to acquired information on face key points of the face image may be implemented by a conventional method or a future development technology, and this disclosure is not limited thereto. For example, the determining the face bounding box according to the information on face key points may be implemented by using an image recognition method and an image processing method.

In one example of the present disclosure, the information on the face key points comprises face key points and one or more face box. Wherein determining the face bounding box according to the acquired information on the face key points of the face image may comprise the steps of: identifying the face image; determining the face key points and the face box of the face image; and determining the face bounding box according to the face key points and the face frame.

Accordingly, in this embodiment, the acquired face image may comprise acquiring a face photograph stored in a terminal device (e.g., the terminal device 103 illustrated in FIG. 1), or may be a face image captured by the imaging module of the terminal device.

Figure 3:
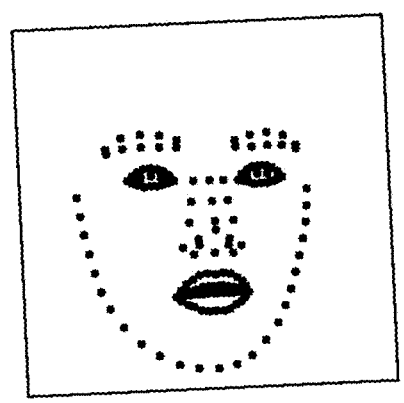
FIG. 3 is a schematic diagram of face key points and a face frame.

Correspondingly, in this embodiment, determining face key points and a face frame of the face image by recognizing the face image comprises: detecting, locating or face-aligning the face key points in the face image by detecting the face key points. Finally, a key area position of information on face key points is located. The information on the face key points comprises eyebrows, eyes, nose, mouth, face contour, and the like (as illustrated in FIG. 3). The face key point detection method may comprise model-based ASM (Active Shape Model), AAM (Active Appearance Model), cascaded shape regression CPR (Cascaded pose regression), or a deep learning-based method.

Correspondingly, in this embodiment, the size of the face bounding box is determined by the size of the convex hull, wherein the convex hull refers to a convex polygon having a minimum area in which given points are enclosed. In other words, given a number of points in the plane, a minimum set of points are connected into a convex polygon such that the given points are all on or within the convex polygon, and such convex polygon is a two-dimensional convex hull of the given points.

Figure 4:
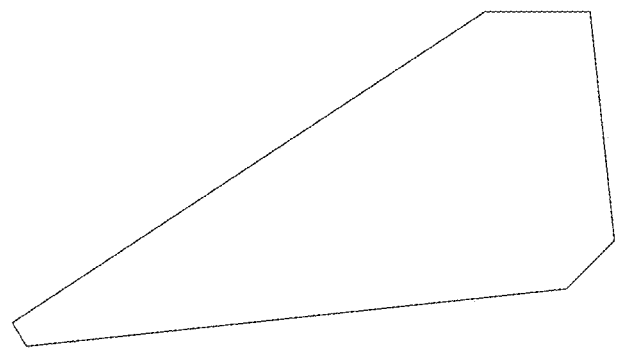
FIG. 4 is a schematic diagram of a two-dimensional convex hull.

In the disclosed embodiment, a two-dimensional convex hull may also be generated by using of an Andrew algorithm, a Graham algorithm, a Melkman algorithm, or the like. These algorithms may be selected according to specific actual needs, and details thereof are not described herein. In a specific embodiment, as illustrated in FIG. 4, the two-dimensional convex hull may be a convex polygon containing six sides. Correspondingly, in this embodiment, when the face bounding box is determined according to the information on the face key points, a plurality of bounding boxes may be generally constructed, one of which may be selected as the final desired bounding box. For example, the smallest area may be selected from the constructed bounding boxes, and the selected bounding box may be used as the final desired face bounding box.

Step 202: constructing a grid according to the face bounding box.

In the present embodiment, the above-described execution entity may divide the face bounding box into a plurality of convex polyhedrons (each convex polyhedron being a grid), and combine vertices of the face bounding boxes within the same grid into one representative point, and combine connection lines for connecting all the representative points to create grids. Each small cell of the grids is a grid, and only those triangles that span three cells are retained in the reduced result, resulting in the grids.

The method of constructing grids according to the face bounding boxes may be the conventional method in the prior art or may be implemented with the future development technology, and this disclosure is not limited thereto. For example, a method of constructing girds by face bounding boxes may be implemented by using a spatial clustering algorithm or a method of a face gird model.

Step 203: deforming, by using an acquired target hairstyle function, edge lines of at least a part of the constructed grids, which comprises the hairstyle, to obtain a deformed grid curve.

In the present embodiment, the above-described execution entity may determine edge lines of at least a part of the constructed grids, which comprises the hairstyle in the grid based on the following.

(1) It may be selected by a pre-trained model that determines edge lines of at least a part of the constructed grids, which comprises the hairstyle. Alternatively, it may determine edge lines of at least a part of the constructed grids, which comprises the hairstyle, from the grids according to pre-set rules.

(2) The edge lines of at least part of the grids, which comprises the hairstyle, are determined by the user himself/herself, e.g. according to the user's preferences, i.e. the edge lines of the grid to be deformed are determined by the user.

After determining the edge lines in the grids that need to be deformed, it may use an acquired target hairstyle function to deform the edge lines of at least a part of the constructed grids, which comprises the hairstyle, to obtain a deformed grid curve.

In some alternative implementations of step 203 of the present disclosure, step 203 may comprise: inputting coordinates of points on the target grid edge into a target hairstyle function to obtain a deformed target grid edge, wherein the coordinates of the point are coordinates corresponding to a coordinate axis parallel to the axis of deflection.

According to the method and apparatus for transforming a hairstyle of the above-described embodiment, by inputting coordinates of midpoints on the target grid edge into the target hairstyle function to obtain a deformed grid curve, the deformed hairstyle in the face image is determined according to the deformed grid curve. In addition, edge lines of at least a part of the grid, which comprises the determined hairstyle, are deformed without needing to deform the entire face image. Accordingly, the output of deformation is accurate, and thus the deformed hairstyle in the face image is not distorted.

Step 204: Determining the deformed hairstyle in the face image according to the deformed grid curve.

In the present embodiment, the execution entity may deform the edge lines of at least part of the grid that includes the hairstyle by using the target hairstyle function in step 203, and then deform the hairstyle curve in the grid, which has not been deformed, to correspond to the deformed grid curve.

Specifically, an association relationship between a hairstyle curve in a pre-deformed grid and an edge line of the pre-deformed grid may be constructed, and thereafter, the deformed hairstyle curve may be determined based on the association relationship and the deformed grid curve. For example, a constraint relationship may be established in which, before deformation, a hairstyle curve in the grid is located in the middle of the right and right side lines of the grid, so that after deformation, the hairstyle curve in the grid is located in the middle of the left and right sides of the grid according to the deformed grid curve, thereby obtaining the hairstyle after deformation in the face image.

According to the method and apparatus for transforming a hairstyle of the above-described embodiment of the present invention, a face bounding box is first determined according to information on the face key point of an acquired face image. Thereafter, grids are constructed according to the face bounding box. Finally, deforming edge lines of at least a part of the grids that include the hairstyle by using the acquired target hairstyle function to obtain a deformed grid curve. In this process, since the edge lines of at least part of the grid that includes the hairstyle are deformed by using the target hairstyle function, the method may deform the edge lines of at least a part of the grid that includes the hairstyle, and thus it does not need to deform the whole face image, and moreover the output of deformation is accurate. Accordingly, the deformed hairstyle in the face image is not distorted. However, the conventional processing of performing affine deformation on the hairstyle and the processing of using the CycleGAN would otherwise result in distortion of the transformed hairstyle.

In some alternative implementations of step 203 of the present disclosure, step 203 may comprise: inputting coordinates of points on the target grid edge lines into the target hairstyle function to obtain a deformed target grid edge, wherein the coordinates of the points refer to coordinates corresponding to a coordinate axis parallel to the axis of deflection; and determining the deformed grid curve based on the deformed target grid edge.

Figure 5:
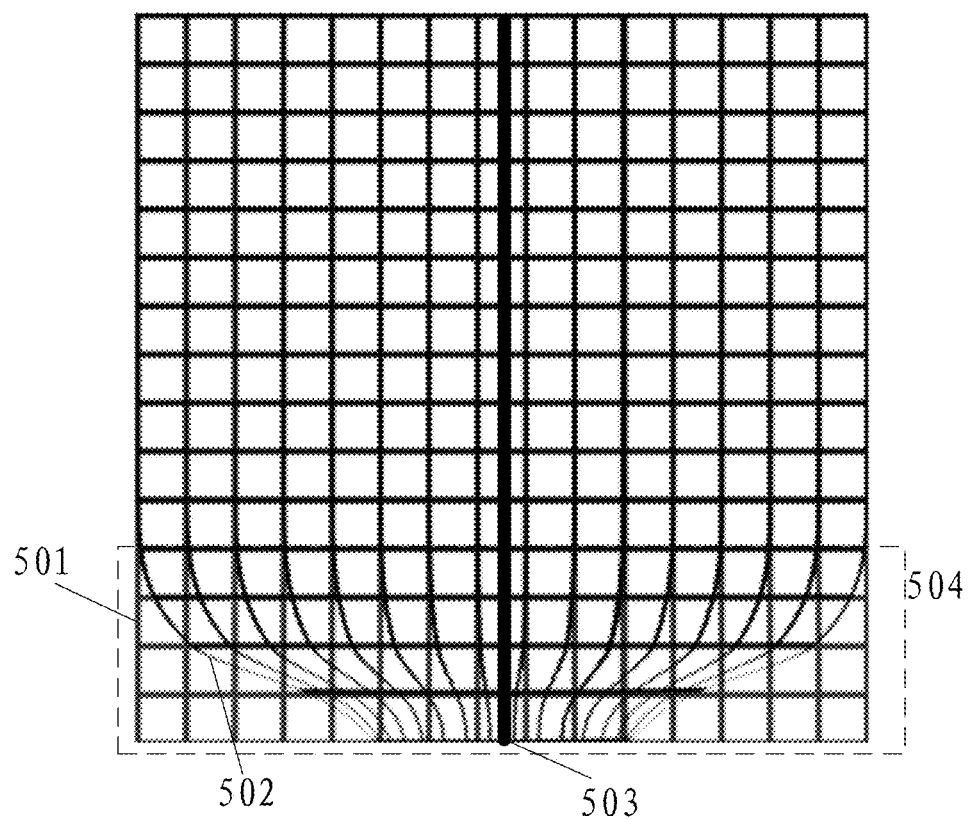
FIG. 5 is a schematic diagram of a grid.

In a specific implementation, as illustrated in FIG. 5, by inputting the coordinates of the points on the target grid edge line 501 into the target hairstyle function, the deformed target grid edge line 502 may be obtained. The deformed grid curve 504 (i.e., all of the deformed target grid lines) is then determined based on the deformed target grid lines 502.

In the present implementation, a coordinate system may be constructed in which the right-most side of the grid is taken as the X-axis, and the top-most edge of the grids which comprise the hairstyle is taken as the Y-axis. And, the coordinates of the points on the edge lines of the target grid are acquired. Then, the required coordinates are input to the target hairstyle function, so that the required coordinates are mapped to the coordinates of the point on the deformed target grid side line one by one.

It shall be understood that the manner by which the coordinate system is constructed as described above is merely one example of constructing the coordinate system and is not a limitation thereto. For example, those ordinary skilled in this art may also construct a coordinate system by taking the leftmost grid edge in the grid as the X-axis and taking the top-most edge of the grids which comprise hairstyle as the Y-axis. Alternatively, the coordinate system may be constructed in other ways so as to obtain the coordinates of the points on the edges of the target grid.

In some alternative implementations of the present disclosure, the target hairstyle function may be determined by: obtaining a target hairstyle curve; uniformly sampling the target hairstyle curve; and fitting the sampled points to obtain the target hairstyle function.

In the present implementation, the manner of fitting may be interpolation, polishing, and least squares. As long as the purpose of fitting the target hairstyle function is ultimately achieved, it is within the scope of the present disclosure.

In the present implementation, a target hairstyle curve is used to simulate a real hairstyle curve. Therefore, edge lines of at least a part of the constructed grids, which comprise the hairstyle, are deformed based on the target hairstyle function obtained from the target hairstyle curve, so that the deformed hairstyle in the determined face image is more consistent with the real hairstyle of the user, thereby improving the user experience.

In some alternative implementations of the above embodiments, after uniform sampling of the target hairstyle curve, the sampled target hairstyle curve may be fitted using a cubic B-spline to obtain a target hairstyle function.

In the present implementation, fitting the sampled points to obtain the target hairstyle function comprises: fitting a plurality of sampled points according to a cubic B-spline to obtain the target hairstyle function.

Figure 6A:
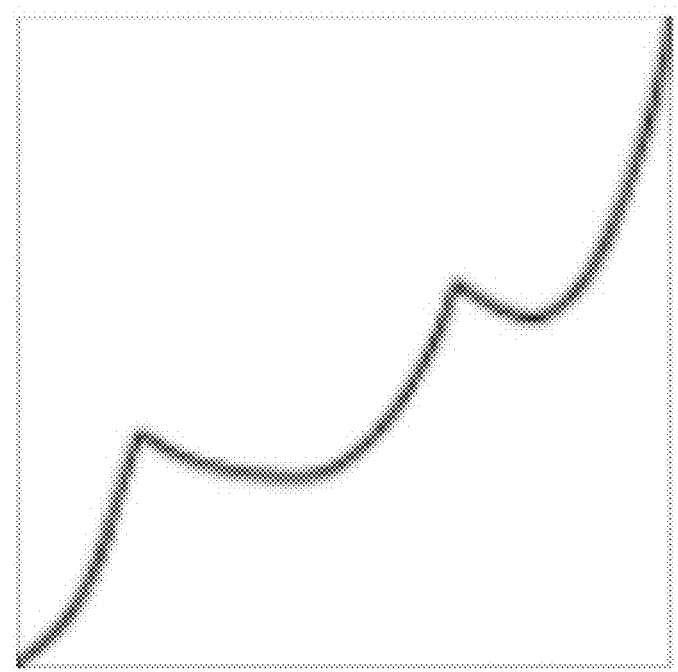
FIGS. 6 (*a*)-6 (*c*) are schematic diagrams for determining the target hairstyle function.
Figure 6B:
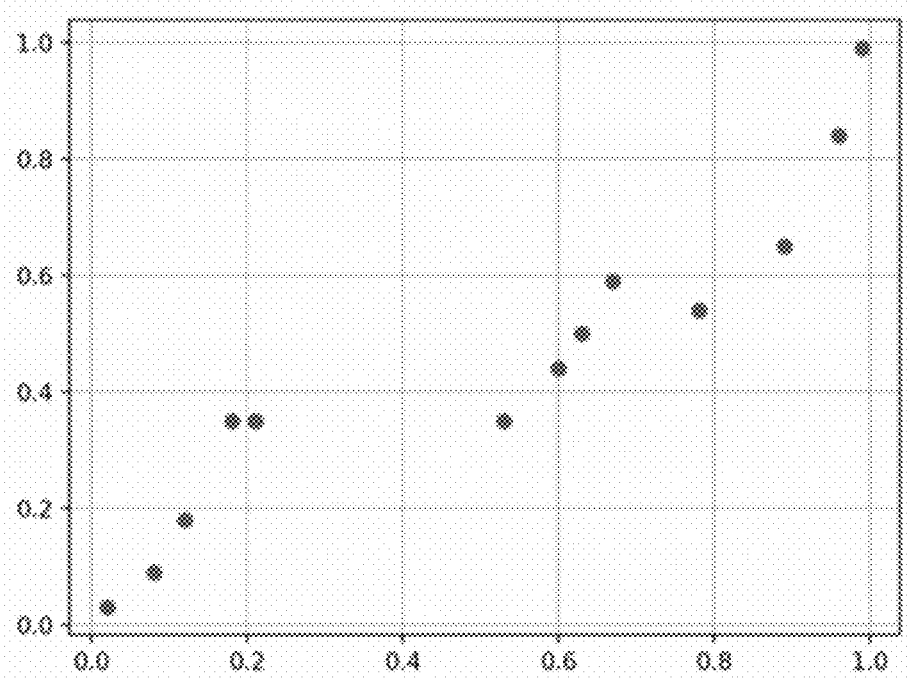
Figure 6C:
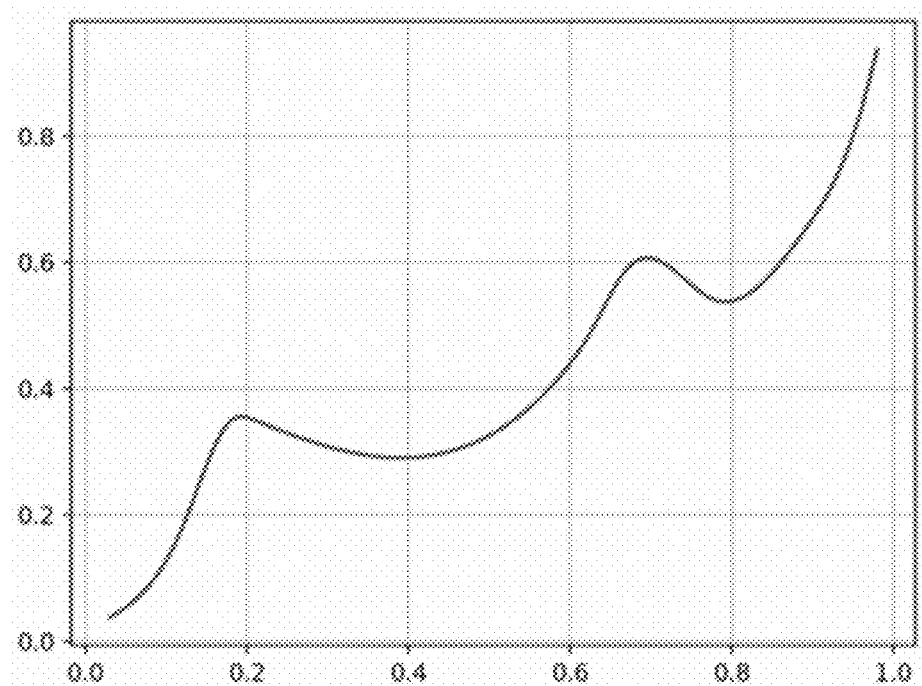

In one specific example, as illustrated in FIG. 6(*a*), a target hairstyle graph is drawn first; Then, as illustrated in FIG. 6 (*b*), the target hairstyle graph is uniformly sampled to obtain a sampling point; Finally, as illustrated in FIG. 6 (*c*), the curve fitting is completed according to the cubic B-spline to obtain the target hairstyle function of the target hairstyle curve.

In the present disclosure, the fitting is performed based on the cubic B-spline, so that the hairstyle corresponding to the fitted hairstyle function is smoother and more consistent with the target hairstyle curve, thereby improving the accuracy of the expression of the fitted function.

It should be understood that the above-described embodiments are merely example embodiments, and do not intend to limit the method for transforming a hairstyle. For example, the above-described method for transforming a hairstyle may further include simultaneously displaying a deformed hairstyle in one or more face images. In addition, the hair change type herein is not limited to the change of the hair type between different genders, but may not be limited to the change of the hair type between the same genders, and details are not described herein.

Figure 9:
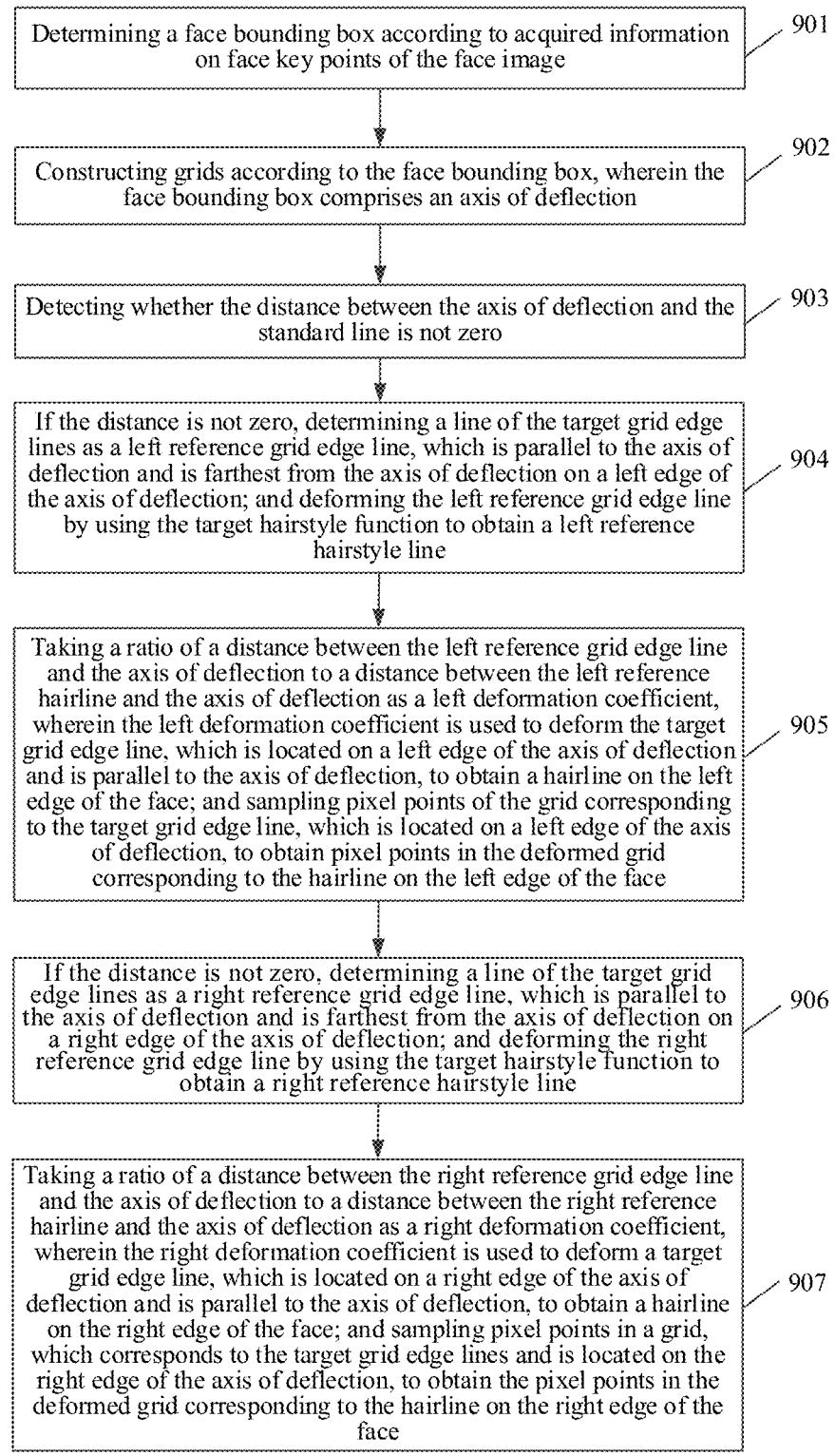
FIG. 9 is a flow chart of another embodiment of a method for transforming a hairstyle according to the present disclosure.

Further referring to FIG. 9, there is illustrated a flow 900 of a method for transforming a hairstyle in accordance with another embodiment of the present disclosure. The method for transforming the hairstyle comprises the following steps.

Step 901: Determining a bounding box according to acquired information on the face key points of the face image.

Step 901 of the present embodiment is consistent with step 201 of the previous embodiment. For a specific implementation of step 901, reference may be made to the description of step 201 in the previous embodiment, and details thereof are not described herein.

Step 902: Constructing grids according to the face bounding box, wherein the face bounding box comprises a axis of deflection.

In the present embodiment, the face bounding box comprises the axis of deflection, wherein the axis of deflection is a grid edge line corresponding to a line of connecting a center of two eyes to a nose in the information on the face key points and indicates a deflection direction of the face to a front face. The direction of the face bounding box may be determined based on the direction of the axis of deflection. For example, if the axis of deflection approximates the vertical direction (that is, the angle between the axis of deflection and the vertical direction is less than a predetermined threshold value), a radial bounding box is used, while if the axis of deflection approximates the horizontal direction (that is, the angle between the axis of deflection and the horizontal direction is less than a predetermined threshold value), an axial bounding box is used.

Here, the radial bounding box is taken as example, when the axis of deflection is in the vertical direction, it is not necessary to adjust the face image. When the axis of deflection is not in the vertical direction, the face image may be adjusted so that the axis of deflection of the face in the adjusted face image is in the vertical direction. At this time, the standard line ("503", as illustrated in FIG. 5) is a grid edge line in the vertical direction, which corresponds to the line connecting a center of two eyes to a nose tip in the information on the face key points when the face in the face images is a front face.

In addition, step 902 of the present embodiment further comprises the operations and features described in step 202 of the foregoing embodiment, and details thereof are not described herein.

Step 903: Detecting whether the distance between the axis of deflection and the standard line is not zero.

In the present embodiment, the method for detecting whether the distance between the axis of deflection and the standard line is not zero may be implemented by the conventional techniques or by the future development technology, and this disclosure is not limited thereto. For example, a method of detecting whether the distance between the axis of deflection and the standard line is not zero may be implemented by an image recognition method and a distance detection method. In one specific example, for example, as shown in FIG. 8 (*a*), the coordinate of the axis of deflection and the coordinate of the standard line are detected, then the differences between the coordinate of the axis of deflection and the coordinate of the standard line are calculated, and whether or not the coordinate difference is not 0 is determined based on the coordinate difference.

Step 904: If the distance is not zero, determining a line of the target grid edge lines as a left reference grid edge line, which is parallel to the axis of deflection and is farthest from the axis of deflection on a left edge of the axis of deflection; and deforming the left reference grid edge line by using the target hairstyle function to obtain a left reference hairstyle line.

In this embodiment, when it is determined in step 903 that the distance between the axis of deflection and the standard line is not zero, determining a line of the target grid edge lines as a left reference grid edge line, which is parallel to the axis of deflection and is farthest from the axis of deflection on a left edge of the axis of deflection.

Figure 8A:
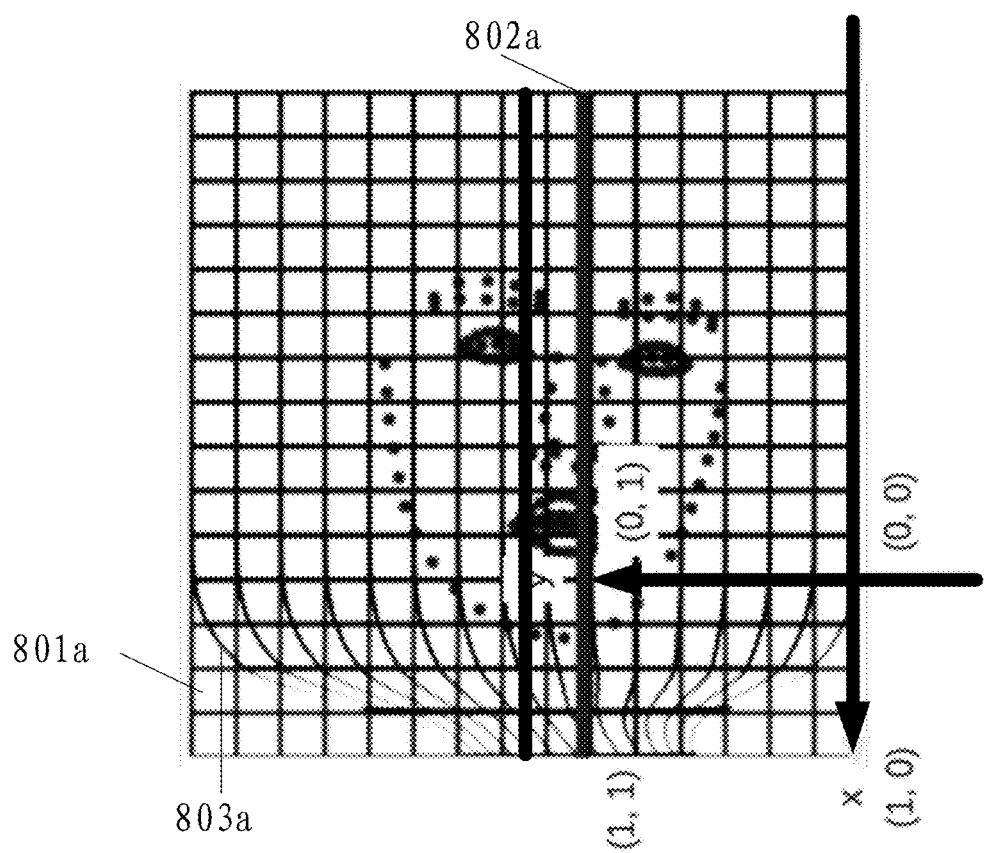
FIGS. 8 (*a*) and 8 (*b*) are schematic diagrams of a grid.
Figure 8B:
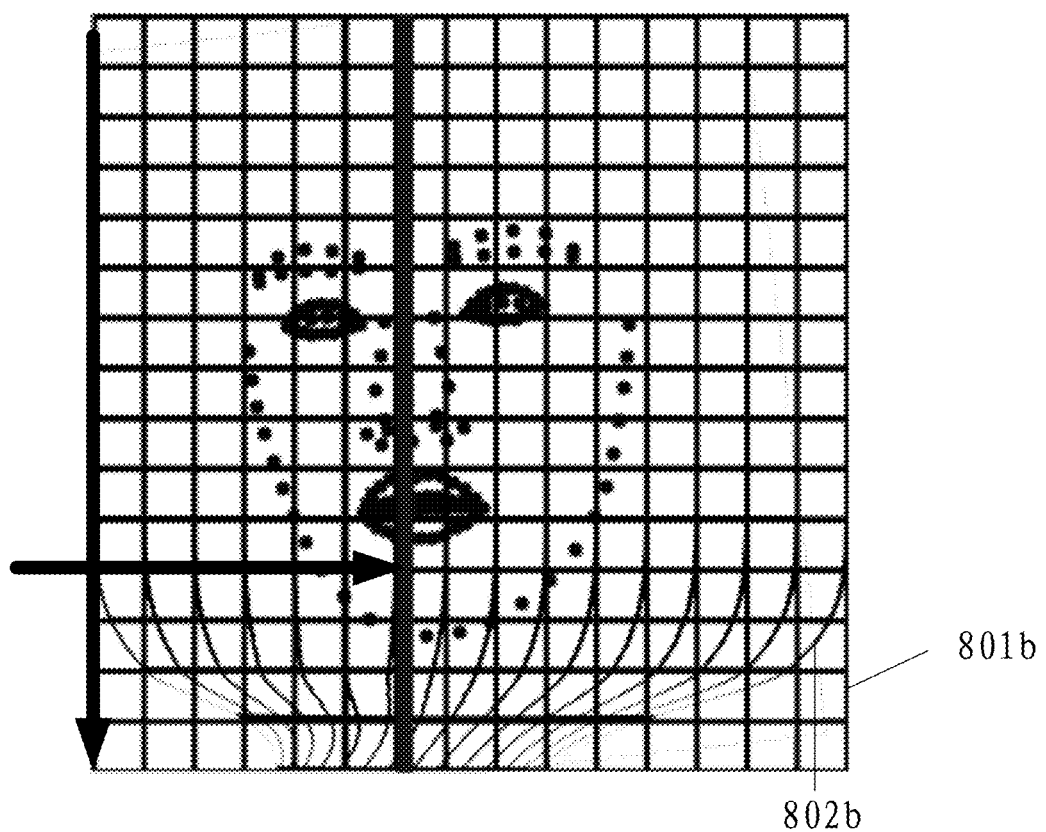

In one specific example, as illustrated in FIG. 8 (a), the left-most grid edge line 801a of the grid is the left reference grid edge line.

In step 905, taking a ratio of a distance between the left reference grid edge line and the axis of deflection to a distance between the left reference hairline and the axis of deflection as a left deformation coefficient, wherein the left deformation coefficient is used to deform a target grid edge line, which is located on a left edge of the axis of deflection and is parallel to the axis of deflection, to obtain a hairline on the left edge of the face; and sampling pixel points of the grid corresponding to the target grid edge lines, which are located on a left edge of the axis of deflection, to obtain pixel points in the deformed grid corresponding to the hairline on the left edge of the face.

In the present embodiment, after determining the left reference grid edge line in step 904, the target grid edge line located on the left edge of the axis of deflection and parallel to the axis of deflection may be suitably deformed by using a ratio of a distance between the left reference grid edge line and the axis of deflection to a distance between the left reference hairline and the axis of deflection.

After determining the left reference grid edge line, the left deformation coefficient is determined based on the ratio of the distance between the left reference grid edge line and the axis of deflection to the distance between the left reference hairline and the axis of deflection. In one specific example, as illustrated in FIG. 8 (a), the distance between the left reference grid edge line and the axis of deflection is obtained from the acquired coordinates of the left reference grid edge line 801a and the axis of deflection 802a; Then, the distance between the left reference hairline and the axis of deflection 802a is obtained from the acquired coordinates of the left reference hairline 803a and the axis of deflection 802a. Finally, the left deformation coefficient is determined based on the ratio of the distance between the left reference grid edge line 801a and the axis of deflection 802a to the distance between the left reference hairline 803a and the axis of deflection 802a.

Figure 7A:
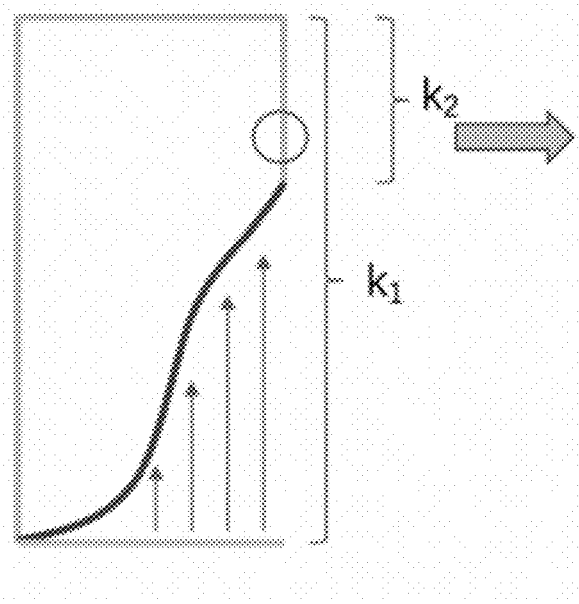
FIGS. 7 (*a*) and 7 (*b*) are schematic diagrams of pixel variations.
Figure 7B:
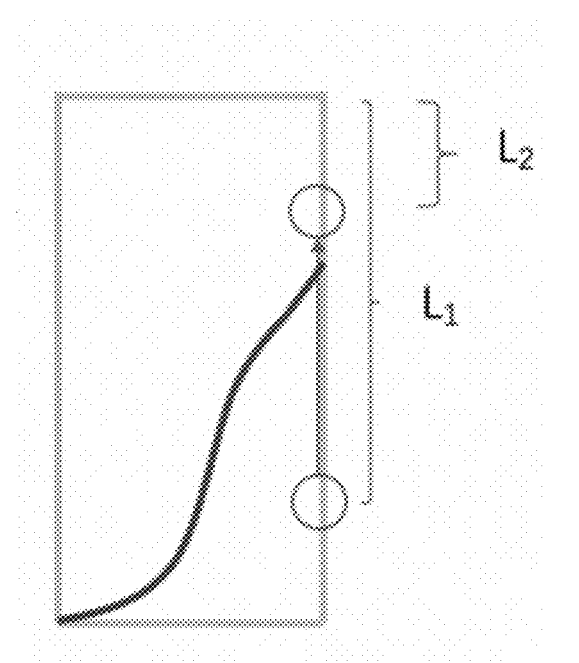

After the left reference grid edge line is determined, deforming the left reference grid edge line by using the target hairstyle function to obtain a left reference hairstyle line. In one specific example, as illustrated in FIG. 7 (a), the ratio of the distance (K1) between the left reference grid edge line and the axis of deflection to the distance (K2) between the left reference hairline and the axis of deflection, i.e., K1/K2, is the pixel deformation ratio. Then, as illustrated in FIG. 7 (b), the left reference grid edge line is deformed according to K1/K2=L1/L2 to obtain the left reference hairline, where L1 is the pixel value of the points on the left reference grid side line, and L2 is the pixel value of the points on the left reference hairline.

After the ratio of the distance between the left reference grid edge line and the axis of deflection to the distance between the left reference hairline and the axis of deflection is used as the left deformation coefficient, the left deformation coefficient is used to deform a target grid edge line located on a left edge of the axis of deflection and being parallel to the axis of deflection to obtain a hairline on the left edge of the face; and sampling pixel points in the grid, which corresponds to the target grid edge lines and is located on a left edge of the axis of deflection, to obtain pixel points in the deformed grid corresponding to the hairline on the left edge of the face.

In one specific example, as shown in FIG. 8 (a), the right-most side of the grid is taken as the X-axis and the top-most side of at least part of the grid of the hairstyle is taken as the Y-axis. Wherein the axis of deflection is a grid line of Y=1, and the line segment "Center of eyes to tip of nose" is then taken as the axis of deflection. Then, the distance between the axis of deflection and the standard line in FIG. 8 (a) is determined, wherein the standard line is a central symmetry axis of grid side lines of the face image, which are parallel to the axis of deflection when the face is a front face. When the distance between the axis of deflection and the standard line in FIG. 8 (a) is not 0, the leftmost one of the grid edges (i.e., the left reference grid edge 801a) is deformed to the target hairstyle function position. In this case, the inner pixel of the leftmost one of the grid edges is deformed according to the left deformation coefficients described in FIGS. 7 (a) to 7 (b) to obtain the hairline on the left edge of the face. The vertical axis from the top to the bottom is regarded as X=0 to X=1, the axis on which the axis of deflection is located is regarded as Y=0, and the axis on which axis of deflection is located is regarded as Y=1.

It should be noted that the leftmost side of the grid may be taken as the X-axis, and the uppermost gird edge of at least part of the gird of the hairstyle may be taken as the Y-axis, wherein the axis of deflection is a grid edge line of Y=1.

Step 906: If the distance is not zero, determining a line of the target grid edge lines as a right reference grid edge line, which is parallel to the axis of deflection and is farthest from the axis of deflection on a right edge of the axis of deflection; and deforming the right reference grid edge line by using the target hairstyle function to obtain a right reference hairstyle line.

In this embodiment, when it is determined in step 903 that the distance between the axis of deflection and the standard line is not zero, the target grid edge line on the right side of the grid, which is parallel to the axis of deflection and farthest from the axis of deflection, may be determined as the right reference grid edge line. In one specific example, as illustrated in FIG. 8 (b), the right-most grid edge of the grid is the right reference grid edge.

After the right reference grid edge line is determined, the acquired target hairstyle function may be used to deform the right reference grid edge line to obtain the right reference hairstyle line. In one specific example, as illustrated in FIG. 8 (b), coordinates of points on the right reference grid edge line 801b are input to the target hairstyle function to obtain the deformed right reference grid edge line 802b. Then, the deformed grid curve is determined based on the deformed right reference grid edge line 802b.

In step 907, taking a ratio of a distance between the right reference grid edge line and the axis of deflection to a distance between the right reference hairline and the axis of deflection as a right deformation coefficient, wherein the right deformation coefficient is used to deform a target grid edge line located on a right edge of the axis of deflection and being parallel to the axis of deflection to obtain a hairline on the right edge of the face; and sampling pixel points in a grid, which corresponds to the target grid edge lines and is located on the right edge of the axis of deflection, to obtain the pixel points in the deformed grid corresponding to the hairline on the right edge of the face.

In the present embodiment, after the right reference grid edge line is determined in step 906, the target grid edge line located on the right edge of the axis of deflection and parallel to the axis of deflection may be suitably deformed using a ratio of the distance between the right reference grid edge line and the axis of deflection to the distance between the right reference hairline and the axis of deflection.

After the right reference grid edge line is determined, the right deformation coefficient may be determined based on the ratio of the distance between the right reference grid edge line and the axis of deflection to the distance between the right reference hairline and the axis of deflection. After the right reference grid edge line is determined, the acquired target hairstyle function may be used to deform the right reference grid edge line to obtain the right reference hairstyle line. Then, the right deformation coefficient is used to deform a target grid edge line located on a right edge of the axis of deflection and being parallel to the axis of deflection, to obtain a hairline on the right edge of the face; and sampling pixel points in a grid, which corresponds to the target grid edge lines and is located on the right edge of the axis of deflection, to obtain the pixel points in the deformed grid corresponding to the hairline on the right edge of the face.

It shall be understood that the processing of the hairline on the right edge of the axis of deflection is similar to the process of deforming the target grid edge line that on the left edge of the axis of deflection and being parallel to the axis of deflection by using the left deformation coefficient to obtain the hairline on the left edge of the face, and details thereof are not described herein.

In the embodiments of the present disclosure, the grids in FIGS. 8 (*a*) and 8 (*b*) are merely illustrative and the number of grids in FIGS. 8 (*a*) and 8 (*b*) is not limited what shown in these FIGS. In practical use, the number of grids may be between 0-255, which may be specifically determined in accordance with the accuracy of the hairstyle deformation, and details thereof are not described herein.

It should be noted that step 901, step 902, step 903, step 904 and step 905 may be executed first, and then step 906 and step 907 may be simultaneously executed to obtain a scheme for transforming the hairstyle. Alternatively, steps 901, 902, 903, 906, and 907 are performed first, and then steps 904 and 905 are performed to obtain a scheme for transforming the hairstyle. Alternatively, step 901, step 902, step 903, step 904, and step 905 are performed without changing the right side or using the method of the embodiment illustrated in FIG. 2, thereby obtaining a scheme for transforming the hairstyle; Alternatively, step 901, step 902, step 903, step 906, and step 907 are performed without deforming the left side or using the method of the embodiment illustrated in FIG. 2, so that a solution for transforming the hairstyle may be included in the technical solution of the present disclosure. The present disclosure is not limited thereto.

In an embodiment of the present disclosure, after the grid side line is deformed, the left deformation coefficient (i.e., the ratio of the distance between the left reference grid side line and the axis of deflection to the distance between the left reference hairline and the axis of deflection) is used to effect deformation of the target grid side line located on a left edge of the axis of deflection and being parallel to the axis of deflection; and sampling pixel points in the grid, which corresponds to the target grid edge lines and is located on a left edge of the axis of deflection, to obtain pixel points in the deformed grid corresponding to the hairline on the left edge of the face. In addition, a right deformation coefficient (i.e., a ratio of a distance between the right reference grid edge and the axis of deflection to a distance between the right reference hairline and the axis of deflection) is used to effect deformation of the target grid edge located on the right edge of the axis of deflection and being parallel to the axis of deflection; the pixel points in the grid, which correspond to the target grid edge lines and are located on the right edge of the axis of deflection, are sampled to obtain the pixel points in the deformed grid corresponding to the hairline on the right edge of the face, so that the deformation of the pixels of the points may be coordinated on the basis of the deformation of the grid lines, the pixels of the on the edge lines of the grids and the pixel of the points on the edge lines of the grids are ensured to be deformed synchronously, and the deformed hairline in the subsequently determined human face image is not distorted.

It shall be understood by a person skilled in this art that, according to the conventional male-to-female video special effect playing method, a CycleGAN image transform architecture is generated and used to ensure stable hairstyle output, but is required to be trained with a completely consistent and robust hairstyle input, which results in the final produced female hairstyle is single in shape, and too simple to operate and may not be modified. However, with the method as proposed in the foregoing embodiments of the present disclosure, the generated human hairstyle is various and rich, and thus the problem that the deformed female hairstyle is single, too simple and uncontrollable in a male-to-female deformation due to too few training samples in a reality human face gender conversion application may be solved. Specifically, according to the technical solution provided in the present disclosure, the image generated by the CycleGAN may be processed in a post-processing manner, so that the image generated by the CycleGAN is stably transformed into the target hairstyle image in real time according to the shape of the hairstyle customized in advance.

Figure 10:
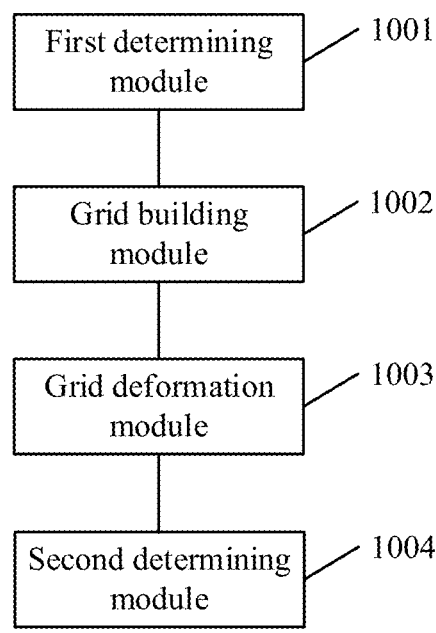
FIG. 10 is a schematic diagram of an apparatus for transforming hairstyle according to embodiments of the present disclosure.

As illustrated in FIG. 10, the apparatus 1000 for transforming a hairstyle of the present embodiment may comprise a first determining module 1001, a grid building module 1002, a grid deformation module 1003, and a second determining module 1004. The first determining module is configured to determine a face bounding box based on information on the face key points of the acquired face image. The grid building module 1002 is configured to build grids based on the face bounding box. The grid deformation module 1003 is configured to deform, by using the acquired target hairstyle function, edge lines of at least a part of the grids, which comprises the hairstyle, to obtain a deformed grid curve. The second determining module 1004 is configured to determine a deformed hairstyle in the face image based on the deformed grid curve.

In the present embodiment, the specific processing of the first determining module 1001, the grid building module 1002, the grid deformation module 1003, and the second determining module 1004, and the technical effects thereof, in the apparatus 1000 for transforming the hairstyle, may be described with reference to the related description of step 201-204 in the corresponding embodiment in FIG. 2, and details are not described herein again. The first determining module 1001 and the second determining module 1012 may be the same module or two different modules.

In some alternative implementations of the present embodiment, the face bounding box comprises an axis of deflection, and the edge lines of at least a part of the grids of the hairstyle comprise target grid edge lines parallel to the axis of deflection, and the grid deformation module 1003 is further configured to input coordinates of points on the target grid edge lines into the target hairstyle function to obtain a deformed target grid edge, wherein the coordinates of the points refer to coordinates corresponding to a coordinate axis parallel to the axis of deflection; and to determine the deformed grid curve based on the deformed target grid edge lines.

In some alternative implementations of the present embodiment, the grid deformation module 1003 is further configured to detect whether the distance between the axis of deflection and the standard line is not zero, wherein the axis of deflection is a grid edge line corresponding to the line connecting the center of the two eyes to a nose tip in the information on the face key points, and the standard line is a grid edge line corresponding to the line connecting the center of two eyes to a nose tip in the information on the face key points when the face in the face image is a front face. The module 1003 is configured to further determine a line of the target grid edge lines as a left reference grid edge line, which is parallel to the axis of deflection and is farthest from the axis of deflection on a left edge of the axis of deflection; and to deform the left reference grid edge line by using the target hairstyle function to obtain a left reference hairstyle line. The second determining module 1004 is further configured to take the ratio of a distance between the left reference grid edge line and the axis of deflection to a distance between the left reference hairline and the axis of deflection as a left deformation coefficient, wherein the left deformation coefficient is used to deform a target grid edge line located on a left edge of the axis of deflection and being parallel to the axis of deflection to obtain a hairline on the left edge of the face. The module 1004 is configured to further sample pixel points in the grid, which corresponds to the target grid edge lines and is located on a left edge of the axis of deflection, to obtain pixel points in the deformed grid corresponding to the hairline on the left edge of the face.

In some alternative implementations of the present embodiment, the grid deformation module 1003 is further configured to determine a line of the target grid edge lines as a right reference grid edge line, which is parallel to the axis of deflection and is farthest from the axis of deflection on a right edge of the axis of deflection. The module 1003 is configured to further deform the right reference grid edge line by using the target hairstyle function to obtain a right reference hairstyle line. The second determining module 1004 is further configured to take a ratio of a distance between the right reference grid edge line and the axis of deflection to a distance between the right reference hairline and the axis of deflection as a right deformation coefficient, wherein the right deformation coefficient is used to deform a target grid edge line located on a right edge of the axis of deflection and being parallel to the axis of deflection to obtain a hairline on the right edge of the face; and sampling pixel points in a grid corresponding to the target grid edge lines, which is located on the right edge of the axis of deflection, to obtain the pixel points in the deformed grid corresponding to the hairline on the right edge of the face.

In some alternative implementations of the present embodiment, the apparatus for transforming the hairstyle further comprises: a hairstyle acquisition module (not illustrated) configured to acquire a target hairstyle curve; a hairstyle sampling module (not illustrated) configured to sample a target hairstyle curve to obtain a plurality of sampling points; and a function fitting module (not illustrated) configured to fit a plurality of sampling points to obtain a target hairstyle function.

In some alternative implementations of the present embodiment, the function fitting module is further configured to fit a plurality of sampled points according to a cubic B-spline to obtain a target hairstyle function.

According to an embodiment of the present disclosure, the present disclosure also provides an electronic device and a computer readable storage medium.

Figure 11:
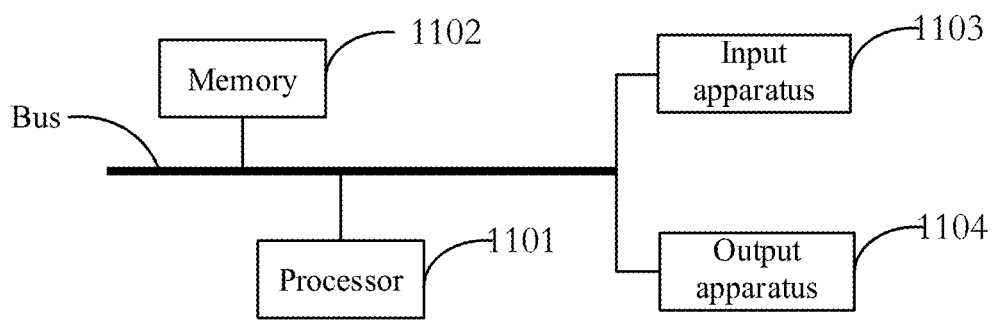
FIG. 11 is a block diagram of an electronic device used to implement the method for transforming a hairstyle of embodiments of the present disclosure.

FIG. 11 is a block diagram of an electronic device for a method for transforming a hairstyle according to an embodiment of the present disclosure. Electronic devices are intended to represent various forms of digital computers, such as laptop computers, desktop computers, worktables, personal digital assistants, servers, blade servers, mainframe computers, and other suitable computers. Electronic devices may also represent various forms of mobile devices, such as personal digital processing, cellular telephones, smart phones, wearable devices, and other similar computing devices. The components shown herein, their connections, relationships, and functions are provided by way of example only and are not intended to limit the implementation of the disclosure described and/or claimed herein.

As illustrated in FIG. 11, the electronic device comprises one or more processors 1101, a memory 1102, and an interface for connecting components, including a high speed interface and a low speed interface. The various components are interconnected by different buses and may be mounted on a common motherboard or otherwise as desired. The processor may process instructions executed within the electronic device, including instructions stored in or on a memory to display graphical information of the GUI on an external input/output apparatus, such as a display device coupled to an interface. In other embodiments, multiple processors and/or multiple buses may be used with multiple memories, if desired. Similarly, a plurality of electronic devices may be connected, each providing a portion of the necessary operations (e.g., as a server array, a set of blade servers, or a multiprocessor system). FIG. 11 illustrates one processor 1101 as an example.

The memory 1102 is a non-transitory computer readable storage medium provided by the present disclosure. The memory stores instructions executable by at least one processor to cause the at least one processor to perform the method for transforming a hairstyle provided by the present disclosure. The non-transitory computer readable storage medium of the present disclosure stores computer instructions for causing a computer to perform the method for transforming a hairstyle provided by the present disclosure.

The memory 1102, as a non-transitory computer readable storage medium, may be used to store non-transitory software programs, non-transitory computer-executable programs, and modules, such as program instructions/modules (e.g., the determination module 1001, the construction module 1002, and the processing module 1003 illustrated in FIG. 10) corresponding to the method for transforming a hairstyle in an embodiment of the present disclosure. The processor 1101 executes various functional applications and data processing of the server by running non-transitory software programs, instructions, and modules stored in the memory 1102, that is, implements the method for transforming a hairstyle in the above-described method embodiment.

The memory 1102 may include a storage program area and a storage data area, wherein the storage program area may store an operating system, an application program that required for at least one function; The storage data area may store data or the like created according to use of an electronic device for image processing. In addition, memory 1102 may include high speed random access memory, and may also include non-transitory memory, such as at least one magnetic disk storage device, flash memory device, or other non-transitory solid state storage device. In some embodiments, the memory 1102 may optionally include a memory disposed remotely relative to the processor 1101 that may be connected to an electronic device for image processing via a network. Examples of such networks include, but are not limited to, the Internet, enterprise intranets, local area networks, mobile communication networks, and combinations thereof.

The electronic device for the method of transforming the hairstyle may further include an input apparatus 1103 and an output apparatus 1104. The processor 1101, the memory 1102, the input apparatus 1103, and the output apparatus 1104 may be connected via a bus or otherwise, as illustrated in FIG. 11.

The input apparatus 1103 may receive input number or character information and generate key signal input related to user settings and functional control of an electronic device for image processing, such as a touch screen, a keypad, a mouse, a track pad, a touch pad, a pointer bar, one or more mouse buttons, a trackball, a joystick, or the like. The output apparatus 1104 may include a display device, an auxiliary lighting device (e.g., an LED), a tactile feedback device (e.g., a vibration motor), and the like. The display device may include, but is not limited to, a liquid crystal display (LCD), a light emitting diode (LED) display, and a plasma display. In some embodiments, the display device may be a touch screen.

The various embodiments of the systems and techniques described herein may be implemented in digital electronic circuit systems, integrated circuit systems, application specific ASICs (application specific integrated circuits), computer hardware, firmware, software, and/or combinations thereof. These various embodiments may be implemented in one or more computer programs that may be executed and/or interpreted on a programmable system including at least one programmable processor, which may be a dedicated or general purpose programmable processor, may receive data and instructions from a memory system, at least one input apparatus, and at least one output apparatus, and transmit the data and instructions to the memory system, the at least one input apparatus, and the at least one output apparatus.

These computing programs (also referred to as programs, software, software applications, or code) include machine instructions of a programmable processor and may be implemented in high-level procedures and/or object-oriented programming languages, and/or assembly/machine languages. As used herein, the terms "machine-readable medium" and "computer readable medium" refer to any computer program product, device, and/or apparatus (e.g., magnetic disk, optical disk, memory, programmable logic device (PLD)) for providing machine instructions and/or data to a programmable processor, including a machine-readable medium that receives machine instructions as machine-readable signals. The term "machine readable signal" refers to any signal used to provide machine instructions and/or data to a programmable processor.

To provide interaction with a user, the systems and techniques described herein may be implemented on a computer having a display device (e.g., a CRT (cathode ray tube) or LCD (liquid crystal display) monitor) for displaying information to the user; And a keyboard and a pointing device (e.g., a mouse or a trackball) through which a user may provide input to a computer. Other types of devices may also be used to provide interaction with a user; For example, the feedback provided to the user may be any form of sensory feedback (e.g., visual feedback, auditory feedback, or tactile feedback); And input from the user may be received in any form, including acoustic input, speech input, or tactile input.

The systems and techniques described herein may be implemented in a computing system including a background component (e.g., as a data server), or a computing system including a middleware component (e.g., an application server), or a computing system including a front-end component (e.g., a user computer having a graphical user interface or a web browser through which a user may interact with embodiments of the systems and techniques described herein), or a computing system including any combination of such background component, middleware component, or front-end component. The components of the system may be interconnected by any form or medium of digital data communication (e.g., a communication network). Examples of communication networks include a local area network (LAN), a wide area network (WAN), and the Internet.

The computer system may include a client and a server. The client and server are typically remote from each other and typically interact through a communication network. The relationship between the client and the server is generated by a computer program running on the corresponding computer and having a client-server relationship with each other. The server may be a cloud server, also referred to as a cloud computing server or a cloud host, and is a host product in a cloud computing service system, so as to solve a problem that the conventional physical host and the VPS service ("Virtual Private Server", or simply "VPS") are difficult to manage and have weak service scalability.

According to the method and apparatus for transforming a hairstyle of the above-described embodiments of the present disclosure, a face bounding box is first determined according to information on the face key points of an acquired face image. Thereafter, grids are constructed according to the face bounding box. Finally, edge lines of at least a part of the constructed grids, which comprises the hairstyle, are deformed by using an acquired target hairstyle function to obtain a deformed grid curve. In the conventional processes as mentioned in the background, the affine transformation is required to be performed on the hairstyle to be deformed, or mass modification on the training data set for training the CycleGAN in an artificial manner is required, which results in distortion of the deformed hairstyle. To the contrary, according to method of the present disclosures, the acquired target hairstyle function is used to deform the edge lines of the part (which comprises the hairstyle) of the constructed grids, and thus the proposed method may only deform the edge lines of said part including the hairstyle. Accordingly, it does not need to transform the whole face image while the output of the deforming is accurate. Therefore, the deformed hairstyle in the face image is not distorted.

It shall be understood that the steps of reordering, adding or deleting may be performed by using the various forms illustrated above. For example, the steps described in the present disclosure may be performed in parallel or sequentially or in a different order, so long as the desired results of the technical solution disclosed in the present disclosure may be realized, and no limitation is imposed herein.

The foregoing detailed description does not intend to limit the scope of the present disclosure. It shall be understood by those skilled in the art that various modifications, combinations, subcombinations, and substitutions may be made depending on design requirements and other factors. Any modifications, equivalents, and modifications that fall within the spirit and principles of the disclosure are intended to be included within the scope of protection of the disclosure.

What is claimed is:

1. A method for transforming a hairstyle, comprising:
   determining a face bounding box according to acquired information on face key points of a face image;
   constructing grids according to the determined face bounding box;
   detecting whether a distance between an axis of deflection and a standard line is not zero; wherein the axis of deflection is a grid edge line corresponding to a line of connecting a center of two eyes to a nose tip in the information on the face key points, and the standard line is a grid edge line corresponding to a line of connecting the center of two eyes to the nose tip in the information on the face key points when a face in the face image is a front face;
   if the distance is not zero, at least one of the followings is performed:
   determining a line of a target grid edge lines as a left reference grid edge line, which is parallel to the axis of deflection and is farthest from the axis of deflection on a left edge of the axis of deflection; and deforming the left reference grid edge line by using a target hairstyle function to obtain a left reference hairstyle line; and
   determining a line of the target grid edge lines as a right reference grid edge line, which is parallel to the axis of deflection and is farthest from the axis of deflection on a right edge of the axis of deflection; and deforming the right reference grid edge line by using the target hairstyle function to obtain a right reference hairstyle line;
   determining a deformed hairstyle in the face image according to the deformed grid curve, comprising:
   taking a ratio of a distance between the left reference grid edge line and the axis of deflection to a distance between the left reference hairline and the axis of deflection as a left deformation coefficient, wherein the left deformation coefficient is used to deform a target grid edge line, which is located on a left edge of the axis of deflection and is parallel to the axis of deflection, to obtain a hairline on the left edge of the face; and sampling pixel points in a grid, which corresponds to the target grid edge lines and is located on a left edge of the axis of deflection, to obtain pixel points in the deformed grid corresponding to the hairline on the left edge of the face; or
   taking a ratio of a distance between the right reference grid edge line and the axis of deflection to a distance between the right reference hairline and the axis of deflection as a right deformation coefficient, wherein the right deformation coefficient is used to deform a target grid edge line located on a right edge of the axis of deflection and being parallel to the axis of deflection to obtain a hairline on the right edge of the face; and sampling pixel points in a grid, which corresponds to the target grid edge lines and is located on the right edge of the axis of deflection, to obtain the pixel points in the deformed grid corresponding to the hairline on the right edge of the face.

2. The method according to claim 1, wherein the target hairstyle function is determined based on the following:
   obtaining a target hairstyle curve;
   sampling the target hairstyle curve to obtain a plurality of sampling points;
   fitting the sampled points to obtain the target hairstyle function.

3. The method according to claim 2, wherein the fitting the sampled points to obtain the target hairstyle function comprises:
   fitting the plurality of sampled points according to a cubic B-spline to obtain the target hairstyle function.

4. An electronic device, comprising:
   at least one processor; and
   a memory connected to the at least one processor; wherein, the memory stores instructions executable by the at least one processor to enable the at least one processor to perform operations comprising:
   determining a face bounding box according to acquired information on face key points of a face image;
   constructing grids according to the determined face bounding box;
   detecting whether a distance between an axis of deflection and a standard line is not zero; wherein the axis of deflection is a grid edge line corresponding to a line of connecting a center of two eyes to a nose tip in the information on the face key points, and the standard line is a grid edge line corresponding to a line of connecting the center of two eyes to the nose tip in the information on the face key points when a face in the face image is a front face;
   if the distance is not zero, at least one of the followings is performed:
   determining a line of a target grid edge lines as a left reference grid edge line, which is parallel to the axis of deflection and is farthest from the axis of deflection on a left edge of the axis of deflection; and deforming the left reference grid edge line by using a target hairstyle function to obtain a left reference hairstyle line; and
   determining a line of the target grid edge lines as a right reference grid edge line, which is parallel to the axis of deflection and is farthest from the axis of deflection on a right edge of the axis of deflection; and deforming the right reference grid edge line by using the target hairstyle function to obtain a right reference hairstyle line;
   determining a deformed hairstyle in the face image according to the deformed grid curve, comprising:
   taking a ratio of a distance between the left reference grid edge line and the axis of deflection to a distance between the left reference hairline and the axis of deflection as a left deformation coefficient, wherein the left deformation coefficient is used to deform a target grid edge line, which is located on a left edge of the axis of deflection and is parallel to the axis of deflection, to obtain a hairline on the left edge of the face; and sampling pixel points in a grid, which corresponds to the target grid edge lines and is located on a left edge of the axis of deflection, to obtain pixel points in the deformed grid corresponding to the hairline on the left edge of the face; or
   taking a ratio of a distance between the right reference grid edge line and the axis of deflection to a distance between the right reference hairline and the axis of deflection as a right deformation coefficient, wherein the right deformation coefficient is used to deform a target grid edge line located on a right edge of the axis of deflection and being parallel to the axis of deflection to obtain a hairline on the right edge of the face; and sampling pixel points in a grid, which corresponds to the target grid edge lines and is located on the right edge of the axis of deflection, to obtain the pixel points in the deformed grid corresponding to the hairline on the right edge of the face.

5. The electronic device according to claim 4, wherein the target hairstyle function is determined based on the following:
   obtaining a target hairstyle curve;
   sampling the target hairstyle curve to obtain a plurality of sampling points;
   fitting the sampled points to obtain the target hairstyle function.

6. The electronic device according to claim 5, wherein the fitting the sampled points to obtain the target hairstyle function comprises:
   fitting the plurality of sampled points according to a cubic B-spline to obtain the target hairstyle function.

7. A non-transitory computer readable storage medium storing computer instructions, wherein the computer instructions are used for causing a computer to perform operations comprising:
   determining a face bounding box according to acquired information on face key points of a face image;
   constructing grids according to the determined face bounding box;
   detecting whether a distance between an axis of deflection and a standard line is not zero;
   wherein the axis of deflection is a grid edge line corresponding to a line of connecting a center of two eyes to a nose tip in the information on the face key points, and the standard line is a grid edge line corresponding to a line of connecting the center of two eyes to the nose tip in the information on the face key points when a face in the face image is a front face;
   if the distance is not zero, at least one of the followings is performed:
   determining a line of a target grid edge lines as a left reference grid edge line, which is parallel to the axis of deflection and is farthest from the axis of deflection on a left edge of the axis of deflection; and deforming the left reference grid edge line by using a target hairstyle function to obtain a left reference hairline line; and
   determining a line of the target grid edge lines as a right reference grid edge line, which is parallel to the axis of deflection and is farthest from the axis of deflection on a right edge of the axis of deflection; and deforming the right reference grid edge line by using the target hairstyle function to obtain a right reference hairstyle line;
   determining a deformed hairstyle in the face image according to the deformed grid curve, comprising:
   taking a ratio of a distance between the left reference grid edge line and the axis of deflection to a distance between the left reference hairline and the axis of deflection as a left deformation coefficient, wherein the left deformation coefficient is used to deform a target grid edge line, which is located on a left edge of the axis of deflection and is parallel to the axis of deflection, to obtain a hairline on the left edge of the face; and sampling pixel points in a grid, which corresponds to the target grid edge lines and is located on a left edge of the axis of deflection, to obtain pixel points in the deformed grid corresponding to the hairline on the left edge of the face; or
   taking a ratio of a distance between the right reference grid edge line and the axis of deflection to a distance between the right reference hairline and the axis of deflection as a right deformation coefficient, wherein the right deformation coefficient is used to deform a target grid edge line located on a right edge of the axis of deflection and being parallel to the axis of deflection to obtain a hairline on the right edge of the face; and sampling pixel points in a grid, which corresponds to the target grid edge lines and is located on the right edge of the axis of deflection, to obtain the pixel points in the deformed grid corresponding to the hairline on the right edge of the face.

8. The non-transitory computer readable storage medium according to claim 7, wherein the target hairstyle function is determined based on the following:
   obtaining a target hairstyle curve;
   sampling the target hairstyle curve to obtain a plurality of sampling points;
   fitting the sampled points to obtain the target hairstyle function.

9. The non-transitory computer readable storage medium according to claim 8, wherein the fitting the sampled points to obtain the target hairstyle function comprises:
   fitting the plurality of sampled points according to a cubic B-spline to obtain the target hairstyle function.

* * * * *

UNITED STATES PATENT AND TRADEMARK OFFICE
CERTIFICATE OF CORRECTION

PATENT NO. : 11,631,154 B2
APPLICATION NO. : 17/202893
DATED : April 18, 2023
INVENTOR(S) : Haotian Peng and Chen Zhao It is certified that error appears in the above-identified patent and that said Letters Patent is hereby corrected as shown below:

On the Title Page

At (30) Foreign Priority Application Data, please delete "2020107585983.6" and insert --202010758598.6-- therefor.

Signed and Sealed this
Eighth Day of August, 2023

Katherine Kelly Vidal
*Director of the United States Patent and Trademark Office*